Patented Oct. 5, 1954

2,690,960

UNITED STATES PATENT OFFICE 2,690,960

DETONATION PROCESS OF MAKING CARBON BLACK

George B. Kistiakowsky, Lincoln, and George D. Halsey, Jr., Murray E. Malin, and Herbert T. Knight, Cambridge, Mass., assignors to Godfrey L. Cabot, Inc., Boston, Mass., a corporation of Massachusetts Application May 9, 1951, Serial No. 225,328

11 Claims. (Cl. 23—209.7)

This invention relates to the production of carbon black by the passage of detonation waves through hydrocarbons in the gaseous, vapor or dispersed liquid state.

The manufacture of carbon black as presently practiced involves the recovery of carbon from a variety of hydrocarbonaceous raw materials, hereinafter referred to as make materials, by two procedures generally described as partial combustion and thermal. The channel process and the furnace process are partial combustion processes. Both involve the combustion of a portion of the hydrocarbon with air. The heat released in this combustion or burning provides the energy to decompose the remainder of the hydrocarbon to carbon black and hydrogen. The energy release and decomposition of the hydrocarbon occur simultaneously in flames of suitable dimensions.

In the so-called thermal processes, air or oxidizing atmospheres are generally excluded during the decomposition. Thus in the thermal process, the reaction retort or furnace is first preheated to reaction temperature (1600–2800° F.) usually by complete burning of air-hydrocarbon mixtures. When reaction temperature is attained in the retort the preheating flame is cut off and the "make hydrocarbon" is admitted to the furnace and undergoes thermal decomposition to carbon black and hydrogen. The thermal decomposition of paraffin hydrocarbons is endothermic (absorb heat) and, consequently, the "make" cycle must be interrupted intermittently and the furnace reheated to reaction temperature. On the other hand, decomposition of some hydrocarbons such as acetylene is exothermic in nature—heat is evolved—so that in the preparation of acetylene black by the thermal process, the temperature of the retort is maintained and it is not necessary to interrupt production by a preheating step in the cycle.

The various so-called explosion processes for preparing carbon black are essentially similar to the above in that they depend on the exothermic character and inflammability of the make material. Instead of introducing the make gases continuously from a port or burner the retort is filled with a suitable make gas mixture under pressure which is then ignited by a spark or flame. These explosion processes in essence are batch processes which to date have never attained commercial significance.

In all of the heretofore known processes described above the velocity of propagation of reaction is relatively slow, being of necessity well below the speed of sound (ca. 300 meters per second) and usually not in excess of a few meters per second. (For a discussion of flame propagation velocities reference may be had to "Explosion and Combustion Processes," Jost and Craft, McGraw-Hill, New York (1946), page 64 et seq.) For example, the normal combustion velocity, as distinguished from detonation velocity, of a stoichiometric mixture of acetylene and air (40% $C_2H_2$, 60% $O_2$) is only 1.5 meters per second.

It has long been recognized that the properties of carbon black improve as the conversion time decreases. In other words, the finest and blackest carbon blacks are those quickly formed and rapidly removed from the reaction zone. So long as reaction continues the carbon nuclei initially formed continue to grow by accretion of new carbon thereon until a recoverable particle results. Since the process of carbon black production is one of particle growth, the ultimate size of the particle thus depends upon the length of time in which the particle is available to take on more carbon.

It is further desirable to remove the completely formed carbon particle quickly from the reaction zone to minimize the time of exposure of the particle to high temperatures. Such exposure to heat causes graphitization of the carbon which impairs its desirable characteristics.

Many attempts have been made to reduce the rate and time of carbon black particle growth. None has heretofore been entirely satisfactory. For example, increasing the rate of gas flow through the reactor does reduce particle growth but results in a product containing excessive quantities of extractible material, indicating incomplete conversion of raw material to carbon black. An alternative expedient is to dilute the make gases in the reaction zone by increasing the air-make gas ratio. This, too, results in a smaller carbon black particle but at the same time burns up excessive quantities of raw material. Both expedients drastically reduce the yield of product.

We have discovered that carbon blacks of many different and improved properties can be produced by passing a detonation wave through a suitable make hydrocarbon or hydrocarbon mixture in the gaseous, vapor or dispersed liquid state. By this we mean that the make material must comprise a gaseous medium that contains a hydrocarbon in one of those forms. Unlike the processes heretofore known and discussed above, including the so-called explosion processes, the process of our invention is neither a combustion nor thermal process as known in the art, but requires the passage of a detonation wave through the make material. These detonation waves travel at velocities exceeding the speed of sound and thus provide reaction times many hundredfold shorter than reaction times heretofore known in the carbon black art.

The mechanism of the present combustion and thermal (including the explosion) processes is one of deflagration in which the reaction products escape from the reaction zone more rapidly than the reactants enter it and the flame front travels relative to the unburned gases at speeds far less than the speed of sound. Thus the pressure build up is relatively slow and uniform and no significant pressure pulse results.

Detonation, on the other hand, is a reaction which proceeds more rapidly than the reaction products can escape from the reaction zone with the result that a sudden surge of pressure, or pressure pulse, of great intensity is experienced. This pressure pulse, or shock wave, of a detonation travels at tremendous velocity, velocities as high as 4000 meters per second having been recorded. Under such conditions the flame front follows behind the pressure wave so that in a detonation, reaction is caused by the detonation wave rather than by the flame front. The high velocity wave front of a detonation may attain a 50-fold increase in pressure and temperatures in excess of 6000° F. No such velocities or pressures are found in explosions of the deflagration type.

It is evident that the mechanism of carbon black formation in our novel detonation process is very different from that of the conventional processes discussed above. The familiar dissociation reaction governed by thermal transfer in such conventional processes is not present in the process of our invention. It is rather that reaction temperature is achieved practically instantaneously by adiabatic compression of the make material as the detonation wave passes therethrough.

The phenomena involved in the initiation and travel of detonation waves are extremely complicated and have not yet been completely interpreted. It is sufficient for the purposes of our invention that the passage of a detonation wave travelling at speeds in excess of 300 m./sec. through a suitable make hydrocarbon will produce carbon black in the incredibly short reaction zone residence time of substantially less than 10 microseconds (millionths of a second). Thus the condition of a short reaction time which is so important in the formation of superior types of small particle size carbon black as discussed above is established by the process of our invention. This will be particularly evident when considering the fact that in present carbon black manufacturing procedures times in the reaction zone are never less than 10,000 microseconds.

It is the principal object of our invention to produce carbon black from suitable hydrocarbons and hydrocarbon mixtures in the gaseous, vapor or dispersed liquid state by the passage of detonation waves therethrough.

It is a further object of our invention to produce in an extremely short reaction time carbon blacks having new and improved properties.

It is a further object of our invention to produce such novel carbon blacks at high yields.

It is a further object of our invention to produce new carbon blacks not heretofore producible by any known method.

We accomplish the objects of our invention by establishing in one portion of an elongated retort a mass of make hydrocarbon gas, vapor or dispersed liquid of sufficient instability to propagate a detonation wave. In the remaining portion of the retort a detonation charge is established, this charge preferably being separated from the make material by a separating medium such, for example, as a rupturable diaphragm or by a narrow zone of inert gas. Actual separation means are desirable since yields and qualities of the carbon black produced are dependent upon the extent to which the integrity of the make-charge is maintained. Without a separating medium of some kind the gaseous detonation and make-charges tend to contaminate one another making uncertain both the ignition of the detonation charge and the character of the detonation wave propogated through the make mixture. Therefore, a separation medium permits closer control over the process than is possible without it.

After the retort has been filled, the detonation charge is ignited by an electric spark or other suitable ignition means. The detonation wave generated by the charge material passes through the make gas for the full length of the retort, causing carbon black to be dissociated therefrom. Upon completion of the reaction the black and combustion products are removed from the retort.

Any suitable detonating mixture can be used as the initiating charge. We have found that strongly detonating mixtures such as stoichiometric mixtures of oxygen and hydrogen, oxygen and acetylene or oxygen and carbon monoxide are quite satisfactory. In each case air can be used instead of oxygen. Non-carbonaceous materials can be used with equal effect since in no event is any carbon black obtained from the detonation charge. Furthermore, in any given retort the volume of the detonation charge is only a small percentage of that of the make gas. It is merely necessary that a sufficient amount of the detonating mixture be present to initiate a detonation wave of sufficient strength and velocity to insure propagation through the make gas.

As we have said, the make material must be capable of sustaining the detonation wave throughout its mass. One of the best raw materials for this process is acetylene because of its extreme instability. Acetylene can be used alone or mixed with oxygen and/or other hydrocarbons. Ethylene-oxygen and butane-oxygen mixtures are also suitable raw materials as are compound mixtures of methane, acetylene and oxygen or gases having similar characteristics. Vaporized or finely dispersed liquid hydrocarbons mixed with oxygen or air or the equivalent are likewise raw materials suitable for the process of our invention.

There are three essential characteristics of make material suitable for carrying out the process of our invention. In the first place, as already stated, it must be in the form of a gaseous medium which contains a hydrocarbon. In the second place, it must be capable of decomposition with the release of energy under the instantaneous pressure of the detonation wave. Thus it must supply energy progressively to the wave in bolster fashion as the wave passes through the make mixture and so compensate for absorption losses which would otherwise cause the wave to dissipate or damp out. In other words the gaseous medium must be thermodynamically unstable at the temperatures and/or pressures created by the shock wave. In the third place, the make material must have an atomic ratio of oxygen to carbon of less than one under conditions of intimate mixing, for if the ratio is greater than one in any region the material in that region will not be converted to carbon black, but rather to carbon monoxide.

The process of our invention will be best understood and appreciated from the following description of a preferred manner of putting it into practice in apparatus suitable for carrying it out as illustrated in the accompanying drawings in which.

Figure 1:
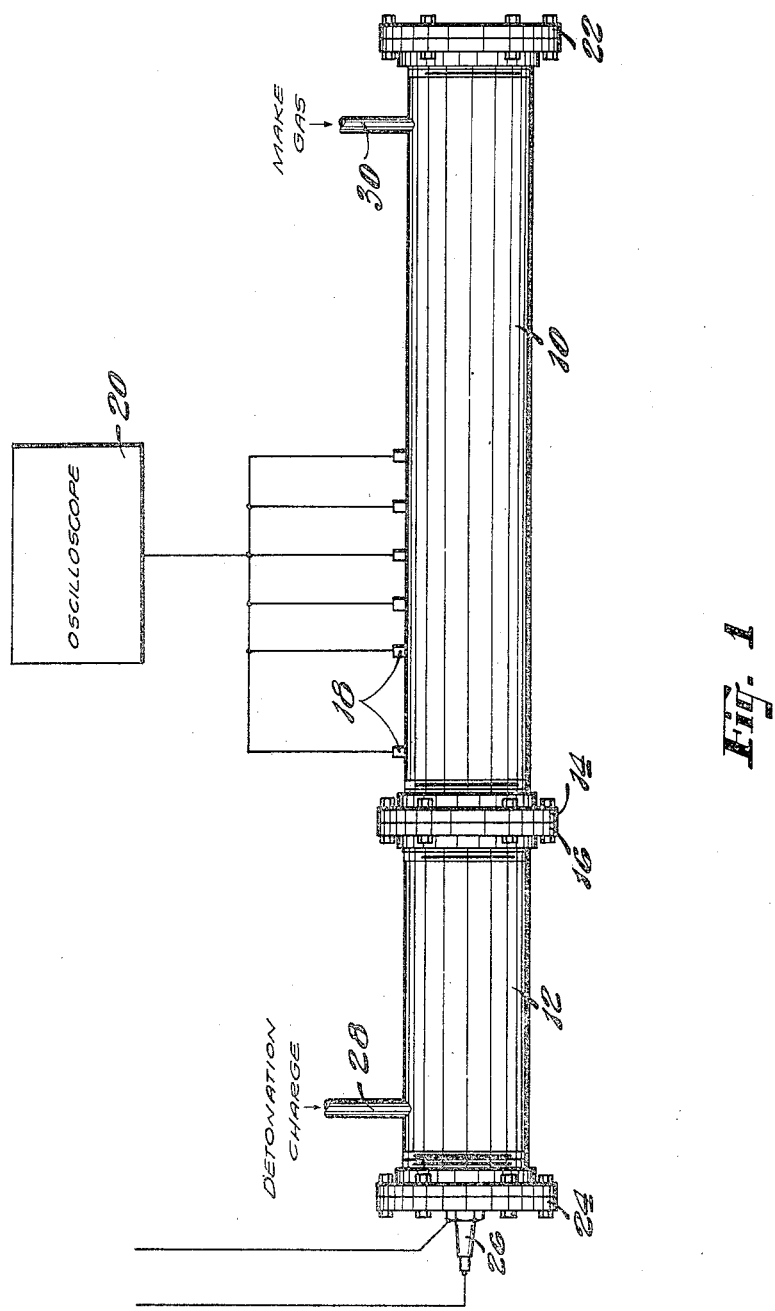
Fig. 1 is a view in elevation of one form of reactor suitable for carrying out the process as a batch process.

The reactor shown in Fig. 1 is in the form of an elongated retort consisting of two pipe sections 10 and 12 having flanged ends and being bolted together at flanges 14 and 16 thus providing a single reactor suitable for batch operation. The retort may be operated in horizontal position as shown or in vertical position. Inserted into the walls at spaced intervals along section 10 are piezo-electric crystals 18 connected into an oscilloscope 20, the operation of which will be discussed below.

A cover plate 22 is secured at one end of the reactor and a second cover plate 24 drilled and tapped for a spark plug 26 is provided at the opposite end.

In carrying out the process of our invention in this reactor, pipes 10 and 12 which are preferably of the same diameter, are bolted together at flanges 14 and 16. A rupturable diaphragm of a material such as cellophane is advantageously inserted between flanges 14 and 16 so as to provide a barrier between the two sections 10 and 12 of the reactor. The detonation charge, which may be a stoichiometric mixture of acetylene and oxygen, etc., as stated above, is introduced into section 12 through pipe 28 which is capped or otherwise closed after filling is complete. The make hydrocarbon is introduced into section 10 through pipe 30 which is likewise closed after filling is complete. Spark plug 26 is then excited and the detonation charge reacts sending a detonation wave through the retort.

Figure 3:
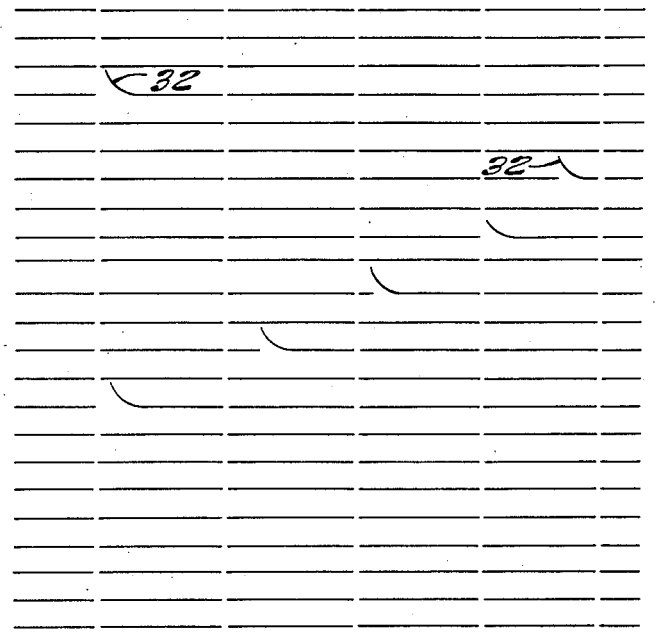
Fig. 3 is a reproduction of an oscillograph record showing the time intervals involved during the passage of a detonation wave through the reactor of Fig. 1.

As the wave passes through the retort, it easily ruptures the diaphragm and records its passage by the pressure wave exerted on the piezo-electric gauges. As shown in Fig. 3, the passage of the wave is recorded in the form of pips 32 on the oscillograph record. The velocity of the detonation wave can then readily be calculated from the time interval between pips and the distance between piezo-electric elements in the retort.

On the record illustrated here each full horizontal line represents a time interval of 25 microseconds subdivided into sections equal to 5 microseconds each. Counting from left to right and down the record the time interval between the first and second pips was 95 microseconds, between the second and third 45 microseconds and so on. With piezo-electric elements spaced 20 cm. between the first two and 10 cm. between the others, it will be seen that the velocity of the detonation wave on the run here illustrated was first 2105 meters per second accelerating to 2222 meters per second thereafter.

Following detonation, combustion gases can be drawn off through either pipe 28 or 30 for analysis if desired and the carbon black can be recovered from the retort by removing cover plate 22.

Figure 2:
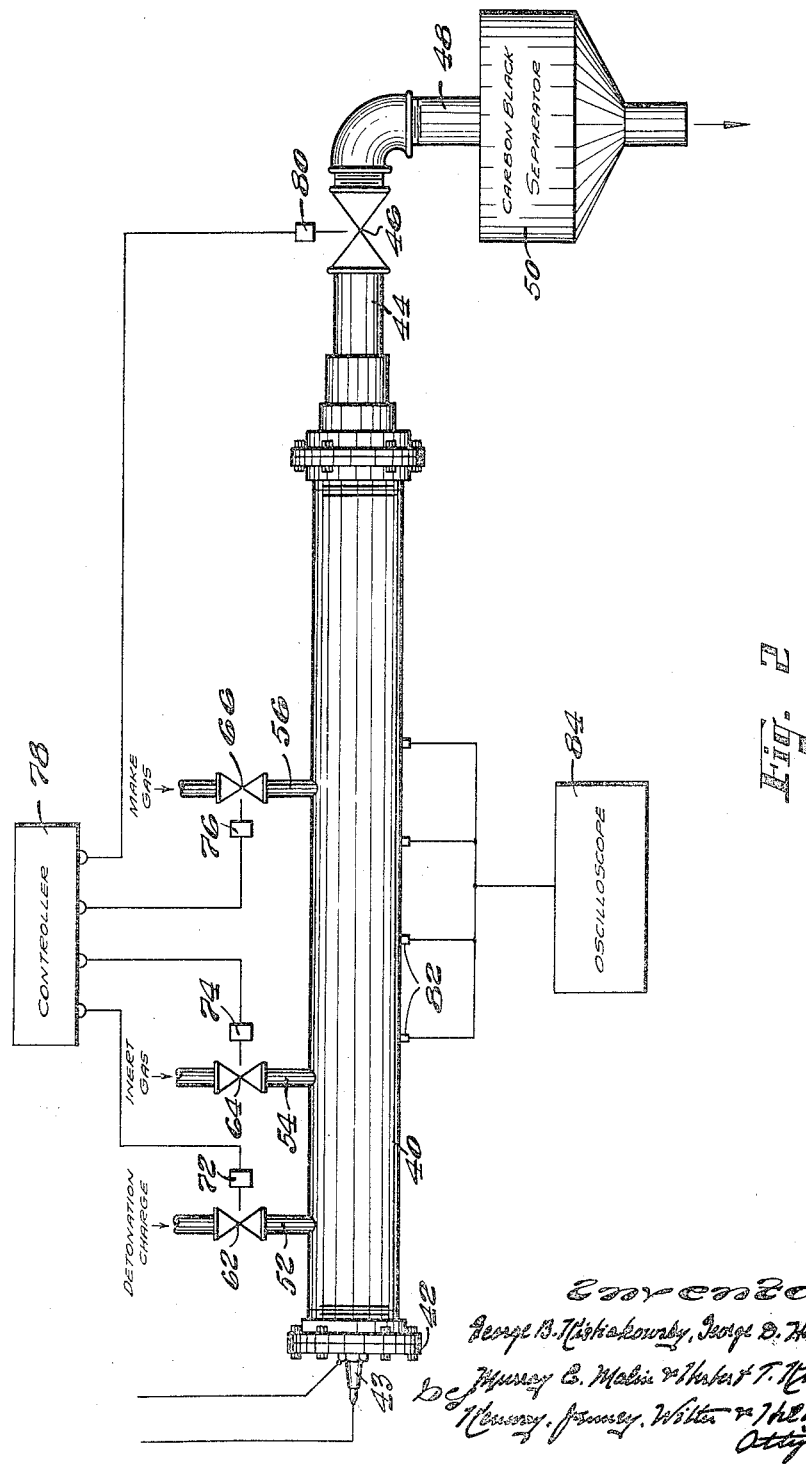
Fig. 2 is a view, partly in diagram, of another type of reactor with automatic controls suitable for commercial production.

Fig. 2 illustrates a form of reactor suitable for use in continuous operation. A detonation carbon black producing unit will ordinarily consist of a plurality of such reactors firing in sequence.

In the drawing, reactor 40, which may be of any convenient length and cross section is provided at one end with a cover plate 42 drilled and tapped for a spark plug 43 or other suitable ignition device and opens at its other end into a discharge conduit 44. This conduit is connected through a valve 46 into an off-take pipe 48 leading into a carbon black separator 50.

Means for introducing a detonation charge, an inert gas barrier and a make gas are provided by pipes 52, 54, and 56, respectively, which lead into the reactor 40 and are equipped with valves 62, 64, and 66, respectively. Actuators 72, 74, and 76 are provided to open and close the valves in accordance with a predetermined sequence set up in a controller 78. The valve 46 likewise has a companion actuator 80 also controlled by the controller 78.

As in the case of the reactor shown in Fig. 1, the reactor 40 of Fig. 2 may be provided with piezo-electric gauges 82 connected into an oscilloscope 84 to record the velocity of detonation wave travel. Such a recording system is not, however, essential in this commercial type apparatus.

In operation, the valve 46 is closed and valves 62, 64, and 66 are opened to permit the passage of the various gases which may be supplied by suitable proportioning pumps. When reactor 40 is fully charged, there will be three zones of gas within. The smallest zone will be that of inert gas which is provided merely to prevent mixing of detonation charge and make gas.

When loading of the reactor is complete, the charging gas valves are closed, the spark plug is excited and immediately thereafter valve 46 is opened so that combustion gases and carbon black will pass on out of the reactor and into the carbon black separator. The carbon black recovery system may be maintained under vacuum to facilitate the removal of carbon black from the reactor. However, the reactor 40 may be operated at elevated or reduced pressures since pressure within the reactor does not restrict the process of our invention.

With respect to pressure within the reactor it may be noted that, unlike the previously known explosion processes which depend upon super-atmospheric pressures for reaction, the process of our invention will function at any reactor pressure. We have made runs at pressures within the reactor of as low as 330 millimeters of mercury as well as at pressures greater than atmosphere. While the pressure within the reactor has some effect upon the quality of the carbon black produced, it has no effect upon the occurrence of the reaction.

To further demonstrate the necessity of super-atmospheric pressures for the ignition of 100% acetylene, we attempted to make a run using 100% acetylene as the charge material. No reaction occurred upon sparking.

It is of interest to note that in the process of our invention, an inert gas barrier does not in any way interfere with the passage of a detonation wave. Although the presence of inert gas would completely quench an explosion wave, it does not quench a detonation wave.

The size of the reactors suitable for use in connection with the process of our invention may be varied over a considerable range. Also, the comparative lengths of reactor sections 10 and 12 in Fig. 1 bear no critical relation to one another. As here illustrated, section 12 is approximately one-fifth the length of section 10. However, depending upon the nature of the detonation charge, section 12 may be considerably shorter or longer as appears preferable.

To operate the process of our invention it is of course, as we have said, essential that the make hydrocarbon be so composed that it will sustain a detonation wave. For a sustained detonation the make hydrocarbon need not exist within its ignition limits. In other words, the ignition or inflammability limits of a hydrocarbon in no way restrict the process of our invention so long as the hydrocarbon or hydrocarbon mixture is thermodynamically unstable. For example, 100% acetylene will sustain a detonation wave and will give very high yields of excellent quality carbon black as will appear from the examples set forth below.

The more stable hydrocarbons will not ordinarily sustain detonation waves unless their instability is increased sufficiently by adding some oxygen-containing gas. Here, however, care must be taken not to add too much oxygen as mixtures in which the ratio of oxygen to carbon atoms is 1 or more may yield no carbon at all.

The following examples are illustrative of the process of our invention. In every run the charge consisted of a mixture by volume of 50% oxygen and 50% acetylene.

EXAMPLE I ber compounds containing medium processing channel (MPC), Shawinigan acetylene and high abrasion furnace (HAF) blacks, respectively. In Example II the scale and $N_2$ adsorption surface areas of the blacks are given in addition to the rubber test data.

EXAMPLE II

Rubber test recipe:

| | |
|---|---|
| GR-S (X-478) | 100 parts. |
| Carbon black | 50 parts |
| Zinc oxide | 3 parts. |
| Sulfur | 1.75 parts. |
| Stearic acid | 1.5 parts |
| Antioxidant (BLE) | 1 part |
| Softener-plasticizer (ParaFlux). | 5 parts |
| Softener-plasticizer (Circosol 2XH). | 3 parts |
| Accelerator (Santocure). | 1 part (detonation blacks); 1.25 parts (MPC, Shawinigan and HAF blacks). |

All cures were 60 mins. @ 292° F.

*Rubber test results and analyticals*

| Black | 400% Modulus | p. s. i., tensile | Percent Elongation | Shore 2 Hardness | Scale | $N_2$ Surface Area | Electrical Resistance in rubber (megohm-cm.) |
|---|---|---|---|---|---|---|---|
| KN | 1,310 | 2,940 | 640 | 71 | 80 | 125 | 0.00017 |
| KC | 1,250 | 2,730 | 600 | 75 | 70 | 249 | 0.00011 |
| MPC | 1,140 | 2,390 | 700 | 63 | 84 | 120 | 199.00 |
| Shawinigan | 1,580 | 1,650 | 410 | 68 | 93 | 64 | .00044 |
| HAF | 2,530 | 2,910 | 430 | 65 | 90 | 90 | .087 |

It will be seen from the foregoing data that the carbon blacks produced by the process of our invention have certain unique and important characteristics, notably in low electrical resistivity. The blacks of the process of our invention also have very good smoothout characteristics, equal to or better than the smoothout of Shawinigan blacks.

It will be noted from the above that remarkable types of carbon black are obtainable by the process of our invention. For instance, commercial acetylene black produced by the Shawinigan process in which acetylene reacts exothermically in a heated retort is a relatively coarse grayish black. On the other hand, the black produced from acetylene by the process of our invention is extremely fine and black.

| Run | Make Gas Composition, Percent | | | | | | | Avg. Wave Velocity, M/sec. | Final Press. mm. Hg | Carbon Black | |
|---|---|---|---|---|---|---|---|---|---|---|---|
| | $O_2$ | $CH_4$ | $C_2H_2$ | $C_2H_4$ | $C_4H_{10}$ | $N_2$ | $C_6H_6$ | | | Scale[1] | Yield |
| KN | | | 100 | | | | | 1,470 | 934 | 79 | 64 |
| KC | 10 | | 90 | | | | | 2,140 | | 70.5 | 76 |
| KD | 15 | | 85 | | | | | 2,164 | | 71.5 | 65 |
| JE | 20 | 53 | 27 | | | | | 1,230–2,200 | | 82.5 | 34 |
| JV | 30 | 40 | | 30 | | | | 1,540 | | | |
| JW | 55 | | | | 45 | | | 850 | | 95 | 19 |
| JY | 14.2 | | 42.9 | | 42.9 | | | 800 | | 94 | 16 |
| 2 | 12 | | 88 | | | | | ~1,100 | 330 | 71.5 | 74 |
| 3 | 6 | | 44 | | | 50 | | ~1,200 | 960 | 68.8 | 62 |
| 4 | 3.1 | | 23.2 | | | 73.7 | | 1,250 | 910 | 74.2 | 41 |
| 5 | 60 | | | | | | 40 | 1,100 | 570 | 77.8 | 28 |

[1] Scale indicates intensity of blackness as determined by the Cabot nigrometer. The lower the figure, the blacker the carbon black.

Samples of carbon black obtained from runs KN and KC of the above Example I, were incorporated in low temperature GR-S synthetic rubber and compared with otherwise identical rubber The very great difference between the detonation and other blacks demonstrates graphically the effect of reaction time on the type of product obtained. From what has been learned in the past, it is clear that in the Shawinigan thermal process, for example, the maximum flame velocity is less than the speed of sound and the minimum time in the reaction zone is 10,000 microseconds. In the detonation process, on the other hand, the maximum length of time in the reaction zone is substantially less than 10 microseconds. The order of magnitude differential between these time periods is undoubtedly responsible for the difference between the particle sizes of the two products described in the above example. With higher wave velocities, up to 2200 m./sec., we have produced blacks from acetylene scaling as low as 68.

The detonation shock wave in the gaseous medium of the make material is such as to cause progressive exothermic reaction by the high progressive local pressure and accompanying temperature which it generates, and the energy thus released maintains and propagates the shock wave. Thus the shock wave is created by the detonation charge, transmitted through the zone of separating gas without accretion of energy, and set up again in the zone of make material with the progressive reinforcement by the release of energy derived from the decomposition reaction which it produces as it travels along the reaction zone.

The reaction is carried out in a confined reaction space herein shown as provided by the cylindrical retorts 10 or 40, and we term the reaction space as "confined" even though the retort may be open at its end. If the end of the reactor is closed, as in Fig. 1, the shock wave may be partially reflected and then immediately dissipated in the spent gases in the retort.

Having thus disclosed our invention and described in detail illustrative examples thereof, we claim as new and desire to secure by Letters Patent:

1. A process for the production of carbon black comprising the steps of introducing a detonation charge into one end of an elongated reaction space to establish a detonation charge zone, introducing an inert gas adjacent the downstream end of the detonation charge zone to establish a relatively thin zone of inert gas and introducing a detonatable fluid make mixture containing a hydrocarbon into the remaining portion of the reaction space, the volume of make mixture being substantially greater than the total volume of the detonation charge and inert gas, igniting the detonation charge, impinging the resulting detonation wave against the make mixture, detonating the said mixture, and recovering the carbon black formed thereby.

2. A process for the production of carbon black comprising the steps of introducing a detonation charge into the end zone of an elongated reaction space and a detonatable make hydrocarbon into the remaining portion of the space, the volume of the make hydrocarbon being substantially greater than that of the detonation charge, separating the detonation charge and make hydrocarbon by a gaseous non-detonating medium, igniting the detonation charge, passing the resulting detonation wave through the separating medium and make hydrocarbon, passing the reaction product gases and carbon black out of the reaction space and into a separation space of substantially greater volume than that of the reaction space whereby the gases are rapidly cooled, and separating the carbon black from said gases therein.

3. A process for the production of carbon black which comprises the steps of confining in one portion of a limited reaction space a make charge of a gaseous medium that contains a hydrocarbon having a hydrogen-carbon ratio not substantially greater than 2 in its composition, which is thermodynamically unstable to the degree that it will detonate when struck by a detonation wave and which contains no more than 1 oxygen atom per carbon atom, confining in another portion of said reaction space a detonation charge of a material which will detonate upon ignition, interposing a separating medium between the make-charge and the detonation charge, igniting the detonation charge, impinging the resulting detonation wave against the make charge whereby the make charge is caused to detonate, and recovering the carbon black produced therefrom.

4. The process of claim 3 in which the detonation and make charges are separated by a rupturable diaphragm.

5. The process of claim 3 in which detonation and make charges are separated by a relatively narrow zone of an inert gas.

6. The process of claim 3 in which the make charge is composed solely of acetylene.

7. The process of claim 3 in which the make charge is composed of a mixture from the group consisting of acetylene and oxygen; acetylene and air; ethylene, methane and oxygen; butane and oxygen; benzine and oxygen; acetylene, ethylene and oxygen; acetylene, butane and oxygen and acetylene, benzene and oxygen.

8. The process of claim 3 in which the detonation charge is a stoichiometric mixture of oxygen and a gas selected from the group consisting of hydrogen, acetylene and carbon monoxide.

9. The process of claim 3 in which the pressure within the reaction space prior to detonation is no greater than atmospheric.

10. A process for the production of carbon black by dissociation of hydrocarbons by the passage of a detonation wave therethrough, which comprises the steps of introducing into one end of a confined elongated reaction space a gaseous make-charge material composed at least in part of a hydrocarbon having a hydrogen to carbon ratio not substantially greater than 2 and which material is thermodynamically unstable to a degree sufficient that it will detonate upon impact from a detonation wave, introducing into the other end of said reaction chamber a detonating charge, interposing a separating medium between the make-charge and the detonating charge, igniting the detonating charge material whereby said material is caused to detonate, impinging the detonation wave against the make material whereby said make material is caused to detonate, immediately conducting the reaction products from the confined reaction space to a separation space of substantially greater volume wherein the reaction product gases are rapidly cooled by adiabatic expansion, and recovering the carbon black from said gases therein.

11. The process defined in claim 10 in which the separating medium comprises a rupturable diaphragm.

References Cited in the file of this patent

UNITED STATES PATENTS

| Number | Name | Date |
|---|---|---|
| 779,728 | Morehead | Jan. 10, 1905 |
| 872,949 | Machtolf | Dec. 3, 1907 |
| 1,669,636 | Venable | May 15, 1928 |
| 1,673,496 | Churchill | June 12, 1928 |